United States Patent Office 3,671,342
Patented June 20, 1972

3,671,342
DYNAMITE COMPOSITION CONTAINING EXPANDED THERMOPLASTIC BEADS
Frank E. Slawinski, Tamaqua, Pa., assignor to Atlas Chemical Industries, Inc., Wilmington, Del.
No Drawing. Filed Jan. 2, 1970, Ser. No. 424
Int. Cl. C06b 1/00, 1/04, 19/04
U.S. Cl. 149—21       12 Claims

ABSTRACT OF THE DISCLOSURE

A dynamite composition comprising an inorganic oxidizer salt, a liquid sensitizer, a gelatinizing agent, and expanded thermoplastic beads and a method of making it. Thermoplastic beads, preferably of polystyrene, containing a blowing agent such as entrapped gas are expanded with heat and are mixed with the inorganic oxidizer salt, the liquid sensitizer, and the gelatinizing agent.

SPECIFICATION

This invention relates to a dynamite composition containing expanded thermoplastic beads and to a method of making it.

BACKGROUND OF THE INVENTION

In underwater seismographic exploration for oil or other minerals, it is sometimes necessary to provide an explosive shock wave under 500 feet of water (about 217 p.s.i.). Dynamites ordinarily will not detonate at these pressures and, if initiated, will not propagate. A sensitizer is therefore necessary.

Until now, the only practical dynamite compositions capable of detonating under 500 feet of water were those containing phenol-formaldehyde hollow microspheres as sensitizers. These tiny spheres are not expansible and are generally purchased in only one size. Thus, a user can lower the density of his product only by using them in excess, which is very wasteful as they are fairly expensive and which requires a readjustment of the oxygen balance since they act as a fuel.

ADVANTAGES OF THE INVENTION

I have discovered that dynamite compositions containing expanded thermoplastic beads will also detonate under 500 feet of water. In addition, the user of the compositions of this invention can control the density of his product without using excess beads. This is because the beads contain a blowing agent, preferably an entrapped gas, so that when they are expanded by being heated to their softening point the gas contained or generated within them expands the beads (but not to such an extent that the cells burst since the cells must be closed). By controlling the temperature and duration of the heating process, the user can control the density of his product without using excess beads. Because of this property of the beads, it is not necessary to include a bulking agent in the composition, although one may be included if desired. Also, the density of product can be altered without altering the amount of beads used; this very helpful since altering the amount used would upset the oxygen balance. Finally, the thermoplastic beads are much less expensive than an equivalent amount of phenol-formaldehyde hollow microspheres.

COMPOSITIONS OF THE INVENTION

The compositions of this invention comprise 1 p.b.w. (part by weight) inorganic oxidizer salt, about 0.3 to 8 p.b.w. liquid sensitizer, up to about 0.6 p.b.w. gelatinizing agent, and about 0.003 to 2.5 p.b.w. expanded thermoplastic beads having a density of about 1 to 60 lbs./ft.$^3$ Preferably, the compositions comprise 1 p.b.w. inorganic oxidizer salt, about 0.5 to 1.7 p.b.w. liquid sensitizer, up to about 0.06 p.b.w. gelatinizing agent, about 0.015 to 0.17 p.b.w expanded thermoplastic beads having a density of about 2 to 10 lbs./ft.$^3$, and about 0.06 to 0.67 p.b.w. of a combustible material such as starch, ivory nut meal, apricot pit meal, walnut shell meal, soy bean meal, wheat flour, cereals, wood pulp, ground cork, bagasse pith, and mixtures thereof. The lower bead concentration and density in the preferred compositions are better because they permit the substitution of the more powerful ammonium nitrate for the less powerful but more oxygen positive sodium nitrate, resulting in a more powerful explosive; also, excess beads are usually unnecessary for sensitivity.

Examples of the inorganic oxidizer salt include ammonium nitrate and sodium nitrate, which are preferred, calcium nitrate, potassium nitrate, and mixtures thereof.

Examples of liquid sensitizers include nitroglycerin (including commercial nitroglycerin which contains nitroglycol), nitroglycol, nitrosorbitol, and mixtures thereof; nitroglycerin, nitroglycol, or mixtures thereof are preferred.

Examples of suitable thermoplastic bead materials include polystyrene, polyethylene, or polyvinyl chloride; polystyrene is preferred. The beads contain a blowing agent which may be a gas or a substance which produces a gas when heated such as ethylene or isobutane. They may contain many bubbles rather than a single bubble, but the average bead size should be between about 0.0004 inch and about 0.3 inch in diameter and preferably about 0.0004 inch to about 0.08 inch in diameter. Examples include "Dylite," unexpanded polystyrene beads containing ethylene gas and sold partially expanded as "Pre-Puffs" by Sinclair Koppers Co., "Styropor," expandable polystyrene beads sold by BASF Corp., and "Saran," vinylidine chloride-acrylonitrile copolymer unexpanded beads sold by Dow Chemical Co. "Pre-Puffs" beads, when expanded, have an average diameter of about 0.04 to 0.187 inch and "Saran" beads, when expanded, have an average diameter of about 0.0004 to 0.004 inch.

The expanded beads are mixed with the inorganic oxidizer salt, the liquid sensitizer, and the gelatinizing agent. The preferred procedure, which results in a very homogeneous mixture, is to first mix the expanded beads with the solid ingredients, such as the inorganic oxidizer salt; and then mix this mixture into a gelatinized liquid sensitizer.

EXAMPLES

Compositions A to D of Table I below were prepared by pregelling the nitroglycol-nitroglycerin, the DNT, and the nitrocotton and the pyrocotton for 3 minutes. A premix of the dry ingredients was then prepared by hand blending. These dry ingredients include ammonium nitrate, wood pulp and, where used, polystyrene beads containing an entrapped gas which had been expanded with steam and air to the densities shown on Table I. The dry ingredients were then mixed with the pregelled ingredients for 5 minutes. Table I shows that the density of the compositions may be significantly lowered to various levels using only 1% expanded beads; thus, Composition A which does not contain expanded beads may be made to have any density within a wide range of densities without the necessity for recalculating and readjusting the oxygen balance. All the compositions detonated after a minimum of 168 hours of direct exposure to water at 4½ p.s.i. (equivalent to a 10-foot hydrostatic head). For a description of the gap sensitivity test, see "The Blaster's Handbook," 15th edition, page 75, published by E. I. du Pont de Nemours and Company.

TABLE I

| Compositions | A | B | C | D |
|---|---|---|---|---|
| Expanded polystyrene beads | | 1.0 | 1.0 | 1.0 |
| Density of beads (lbs./cu. ft.) | | 10 | 6 | 2 |
| 80% nitroglycol-20% nitroglycerin | 32.8 | 32.8 | 32.8 | 32.8 |
| DNT | 2.1 | 2.1 | 2.1 | 2.1 |
| Nitrocotton | 0.5 | 0.5 | 0.5 | 0.5 |
| Nitrocellulose (pyrocotton) | 0.3 | 0.3 | 0.3 | 0.3 |
| Ammonium nitrate (fine grade) | 38.1 | 38.1 | 38.1 | 38.1 |
| Ground sodium nitrate | 19.1 | 19.1 | 19.1 | 19.1 |
| Wood pulp | 3.5 | 3.5 | 3.5 | 3.5 |
| Sulfur | 1.6 | 1.6 | 1.6 | 1.6 |
| Sorghum flour | 1.0 | | | |
| Chalk | 1.0 | 1.0 | 1.0 | 1.0 |
| Number of 1¼ by 8 inch cartridges required to equal 50 pounds | 100.2 | 106.2 | 108.3 | 115.5 |
| Gel density, grams/cc | 1.452 | 1.364 | 1.346 | 1.267 |
| Gap sensitivity test (inches) | 18 | 18 | 16 | 18 |
| Velocity (D'Autriche Method) (f.p.s.) | 18,016 | 17,716 | 17,716 | 16,559 |

In order to test various dynamite compositions under high heads of water, a special test apparatus was used. A 40" length of 3" steel pipe was closed at one end with a ½" thick steel disc cut to fit the inside diameter of the pipe and welded into position. A forged steel, slip-on flange was welded to the other end.

Two 2" x 14" dynamite cartridges, containing various compositions to be described, were placed in the pipe against the disc end and were held in place with thin strips of wood. A #8 seismograph electric blasting cap was inserted in the top of the explosive cartridge. Two rubber gaskets were placed over the flange, the lead wires were brought out between the rubber gaskets, and a suitable second flange was bolted over the first flange. Through a lead-in tube in the second flange water was admitted and maintained at 217 p.s.i. for 24 hours.

Continuing the pressure by shutting off a needle valve, the steel pipe was placed horizontally on three 3" x 3" x 1" steel plates which were centered on lead cylinders at 12" centers; the dynamite was then detonated. The height of each lead cylinder was measured to determine the percent compression, beginning with the cylinder closest to the blasting cap. If the explosion propagated, the percent compression will be high for all three cylinders. If the explosion was dying out, the 2nd and 3rd cylinders will be less and less compressed.

Table II shows the dynamite compositions used (in percent by weight) and shows that the explosions propagated completely with each composition. Satisfactory results are also obtained when "Saran" beads are substituted for the polystyrene beads of these compositions.

TABLE II

| | A | B | C | D |
|---|---|---|---|---|
| 80% nitroglycol-20% nitroglycerin (percent) | 50.5 | 50.5 | 50.5 | 50.5 |
| Nitrocotton (percent) | 1.8 | 1.8 | 1.8 | 1.8 |
| Ground NaNO$^3$ (percent) | 30.5 | 30.5 | 30.5 | 30.5 |
| Wood pulp (percent) | 7.5 | 7.5 | 7.5 | 7.5 |
| #3 apricot pit pulp (percent) | 2.0 | 2.0 | 2.0 | 2.0 |
| Expanded polystyrene beads (percent), density: | | | | |
| 4 lbs./cu. ft. | 1.0 | | | |
| 6 lbs./cu. ft. | | 1.0 | | |
| 8 lbs./cu. ft. | | | 1.0 | |
| 10 lbs./cu. ft. | | | | 1.0 |
| Pigment grade barium sulfate (percent) | 2.0 | 2.0 | 2.0 | 2.0 |
| Sorghum flour (percent) | 2.0 | 2.0 | 2.0 | 2.0 |
| Chalk (percent) | 1.0 | 1.0 | 1.0 | 1.0 |
| Number of 1¼" × 8" cartridges required to equal 50 lbs. | 106.4 | 102.4 | 98.3 | 100.8 |
| Test results, percent: | | | | |
| 1st lead cylinder | 37.5 | 59.4 | 60.9 | 62.5 |
| 2d lead cylinder | 53.1 | 50.0 | 56.3 | 53.1 |
| 3d lead cylinder | 59.4 | 54.7 | 56.3 | 50.0 |
| Velocity (D'Autriche Method) (f.p.s.) | 19,440 | 19,440 | 20,947 | 20,513 |

Table III below gives a screen analysis of the expanded polystyrene beads used in the compositions of Table II:

TABLE III

| Density (lbs./cu. ft.) | 4.0 | 6.0 | 8.0 | 10.0 |
|---|---|---|---|---|
| Screen test: | | | | |
| Percent passing USS: | | | | |
| #10 | 100.0 | 100.0 | 100.0 | 100.0 |
| #12 | 95.0 | 97.7 | 97.5 | 97.8 |
| #14 | 70.0 | 93.0 | 90.0 | 88.9 |
| #20 | 5.0 | 30.2 | 25.0 | 17.8 |
| #35 | 0.0 | 0.0 | 0.0 | 0.0 |

What is claimed is:

1. A dynamite composition comprising an inorganic oxidizer salt, a liquid sensitizer, and polystyrene beads expanded to a density of about 2 to 10 lbs./ft.$^3$ and an average diameter of about 0.04 to 0.187 inch.

2. A dynamite composition containing 1 p.b.w. inorganic oxidizer salt, about 0.3 to about 8 p.b.w. liquid sensitizer, up to about 0.6 p.b.w. gelatinizing agent, and about 0.003 to about 2.5 p.b.w. expanded polystyrene beads.

3. The composition of claim 2 wherein said inorganic oxidizer salt is ammonium nitrate, sodium nitrate, or mixtures thereof.

4. The composition of claim 2 wherein said liquid sensitizer is nitroglycerin, nitroglycol, or a mixture thereof.

5. The composition of claim 2 wherein said gelatinizing agent is nitrocellulose.

6. A dynamite composition comprising 1 p.b.w. inorganic oxidizer salt, about 0.5 to about 1.7 p.b.w. liquid sensitizer, up to about 0.6 p.b.w. gelatinizing agent, about 0.015 to 0.17 p.b.w. polystyrene beads expanded to a density of about 2 to about 10 lbs./ft.$^3$ and an average diameter of about 0.04 to 0.187 inch, and about 0.06 to about 0.67 p.b.w. combustible material.

7. The composition of claim 6 wherein said inorganic oxidizer salt is ammonium nitrate, sodium nitrate, or mixtures thereof.

8. The composition of claim 6 wherein said liquid sensitizer is nitroglycerin, nitroglycol, or a mixture thereof.

9. The composition of claim 6 wherein said gelatinizing agent is nitrocellulose.

10. A method of making a dynamite composition comprising expanding polystyrene beads which contain a blowing agent to a density of about 2 to 10 lbs./ft.$^3$ and an average diameter of about 0.04 to 0.187 inch, and mixing said expanded beads with an inorganic oxidizer salt, a liquid sensitizer, and a gelatinizing agent.

11. The method of claim 10 wherein said blowing agent is an entrapped gas.

12. The method of claim 10 wherein said expanded beads are first mixed with the inorganic oxidizer salt and this mixture is then mixed with liquid sensitizer which has been gelatinized.

References Cited

UNITED STATES PATENTS

| | | | |
|---|---|---|---|
| 3,101,288 | 8/1963 | Coursen et al. | 149—21 |
| 3,155,554 | 11/1964 | Cook et al. | 149—46 |
| 3,397,097 | 8/1968 | Atadan et al. | 149—46 |
| 3,457,126 | 7/1969 | Travers et al. | 149—2 |
| 3,522,117 | 7/1970 | Atadan et al. | 149—46 X |

LELAND A. SEBASTIAN, Primary Examiner

U.S. Cl. X.R.

149—2, 18, 49, 50, 60, 64, 65, 88, 98, 103, 104, 110

UNITED STATES PATENT OFFICE
CERTIFICATE OF CORRECTION

Patent No. 3,671,342           Dated June 20, 1972

Inventor(s)   Frank E. Slawinski

It is certified that error appears in the above-identified patent and that said Letters Patent are hereby corrected as shown below:

Column 3, Table II, approximately line 50, "Ground $NaNO^3$ (percent)" should read -- Ground $NaNO_3$ (percent) --.

Signed and sealed this 24th day of October 1972.

(SEAL)
Attest:

EDWARD M. FLETCHER, JR.           ROBERT GOTTSCHALK
Attesting Officer           Commissioner of Patents